B. A. LEWIS.
DENTAL BRUSH.
APPLICATION FILED OCT. 12, 1916.
1,242,821.
Patented Oct. 9, 1917.
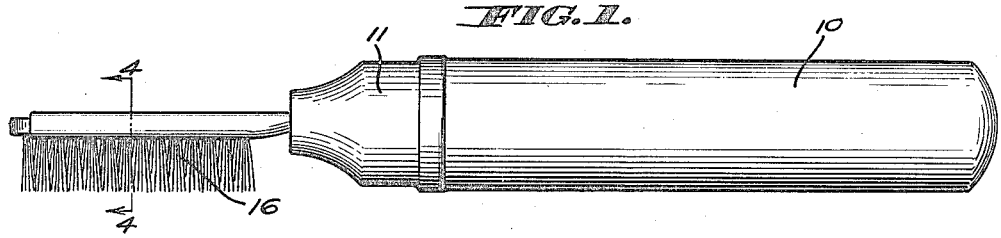
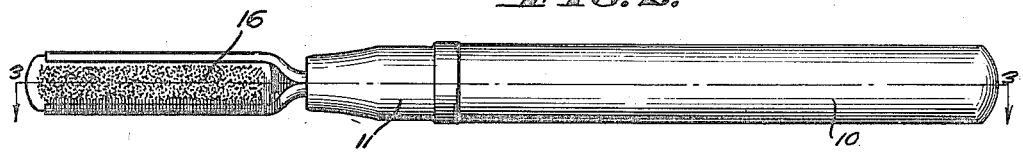
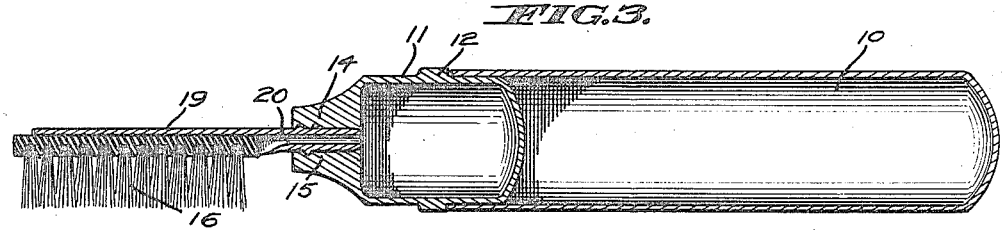
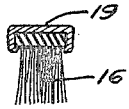
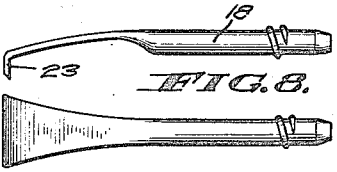
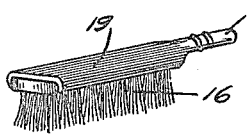
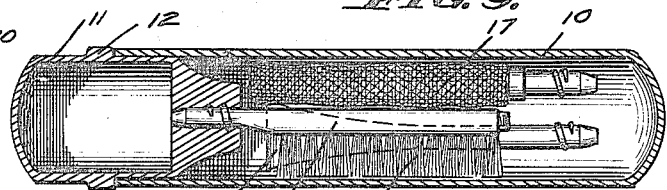
INVENTOR:
BERNARD A. LEWIS:
BY Hazard Berry & Miller
ATTORNEYS:

UNITED STATES PATENT OFFICE.

BERNARD A. LEWIS, OF LONG BEACH, CALIFORNIA.

DENTAL BRUSH.

1,242,821.   Specification of Letters Patent.   Patented Oct. 9, 1917.

Application filed October 12, 1916. Serial No. 125,304.

*To all whom it may concern:*

Be it known that I, BERNARD A. LEWIS, a citizen of the United States, residing at Long Beach, in the county of Los Angeles and State of California, have invented new and useful Improvements in Dental Brushes, of which the following is a specification.

This invention relates to a dental appliance and particularly pertains to teeth cleaning tools and a case therefor.

An object of this invention is to provide a dental appliance which is formed with a handle adapted to be utilized as a casing for various dental tools, such as a brush, polisher, or a scraper, and which may permit either of these tools to be detachably mounted within this casing for use.

Another object is to provide simple means for permitting the removal of tools from their mounting and to permit the interchange of these tools as desired.

Another object is to provide a simple means whereby the bristles and binding back of a tooth brush may be interchangeably secured within a holder so that it may be readily discarded when worn.

Another object is to provide a handle within which a number of desired tools may be carried as well as a supply of dentifrice.

It is a further object to provide an appliance of the above character which is simple in its construction, light in weight, and within which various parts may be replaced without difficulty.

Other objects will appear hereinafter.

The invention is illustrated, by way of example, in the accompanying drawings in which:

Figure 1 is a view in side elevation illustrating the appliance as fitted for use as a tooth brush.

Fig. 2 is a view in plan illustrating the appliance as shown in Fig. 1.

Fig. 3 is a view in longitudinal section through the appliance as seen on the line 3—3 of Fig. 1 and as illustrating the handle and removable head construction.

Fig. 4 is a view in transverse section as seen on the line 4—4 of Fig. 1 and illustrates the detachable manner in which the brush is held within its holder.

Fig. 5 is a view in elevation with parts broken away to illustrate a tooth polisher adapted to be supplied as one of the accessories of the appliance.

Fig. 6 is a view in transverse section through the polisher and particularly discloses its triangular formation.

Fig. 7 is a view in side elevation illustrating a scraper supplied with the set.

Fig. 8 is a view in elevation illustrating the scraper as shown in Fig. 7.

Fig. 9 is a view in longitudinal section as seen through the casing as assembled.

Fig. 10 is a perspective view of the dental brush removably mounted in a brush holder.

Referring more particularly to the drawings, 10 indicates a tubular handle which may be formed of any special configuration but is here shown as being ovoidal in cross-section and having one end closed while the other end is open, the sides of the handle being substantially straight and parallel. Mounted within the opened end of the handle is a reversible head 11 which performs the function of closing the compartment within the handle and also of affording a fitting for various accessories adapted to be used with the handle. This head is formed with a shoulder 12 which abuts against the square end of the handle and permits it to be telescoped within the handle when in either of its positions. One end of the head is formed with a reduced neck portion 14 which has a longitudinal bore 15 extending concentrically through it. This bore is threaded to receive the threaded shanks of the various accessories to be mounted upon the handle and used therewith.

The head 11 is adapted to receive interchangeably a tooth brush 16, a polisher 17, and a scraper 18, while it is evident that other dental instruments might be supplied. The brush 16 is of ordinary construction and is formed with bristles mounted within a bone or rubber backing as desired. This backing is adapted to be detachably mounted within a brush holder 19 which is formed with a threaded shank 20 provided to fit within the bore of the head when desired. The body portion of the brush holder is channel shape, as particularly shown in Fig. 4 of the drawings, and is adapted to allow the brush back to be longitudinally slid into and out of position when desired. In this manner worn brushes may be readily replaced, which is essential to a device of this character where the handle will ordinarily outwear a large number of brushes.

The polisher, particularly shown in Fig.

5 and Fig. 6 of the drawings, is formed with a simple core 21 which is threaded at one end to permit it to be mounted within the head 11 and which has a longitudinally extending body portion of triangular cross-section. This core is preferably formed of fiber so that it will be semi-rigid and will not be disagreeable to the user. Mounted upon the triangular body portion of the core 21 is a fabric stocking 22 which is adapted to be used in polishing the surface of the teeth.

The scraper illustrated in Figs. 7 and 8 of the drawings is likewise formed with a threaded shank and is flattened and widened at its outer end to form a scraper blade 23 adapted to be used to remove tartar and other foreign substances from the teeth and also in scraping the tongue.

In operation, the appliance is assembled as illustrated in Fig. 9 of the drawings, with all of the accessories within the combined casing and handle 10. In this view the tooth brush is shown mounted within its holder and that in turn secured within the head 11 of the handle. To use the tooth brush the head is withdrawn and reversed so that the solid end will be seated within the opening of the handle. This will permit the brush to be used in conjunction with the handle 10. It is evident that other of the accessories may be interchanged with the brush and its holder and may be conveniently manipulated by means of the handle. When the bristles of the brush become worn, the brush may be readily replaced by slipping it out from its holder and replacing it with another brush. By forming the handle and head of oblong cross-section, these parts cannot turn in relation to each other when connected together.

It will thus be seen that the appliance here described and illustrated in the drawings affords a simple means for portably and sanitarily inclosing a set of dental accessories within a combined handle and receptacle and provides means whereby the accessories may be mounted in an operative position in relation to the handle and may be readily exchanged one with the other as well as renewed when worn.

I claim:

1. In a dental appliance, the combination with a combined handle and receptacle, of a head adapted to inclose the open end of said receptacle, a brush holder, a brush, means whereby said holder may be detachably secured on said head, and means whereby said brush may be removably secured within said holder.

2. In a dental appliance, the combination with a combined handle and receptacle, of a reversible head adapted to be detachably mounted within the opened end of said receptacle, and a dental accessory adapted to be removably mounted on said head, said head and receptacle being of oblong cross-section whereby the head is held against rotation in relation to the receptacle when inserted therein.

3. In a dental appliance, the combination of a tubular handle closed at one end, a reversible tubular head provided with a circular outer shoulder intermediate its ends and adapted to telescope into and close the open end of said tubular handle, and a dental accessory adapted to be removably mounted on said head.

4. In a dental appliance, the combination with a tubular handle closed at one end, of a reversible telescopic head adapted to be detachably mounted within the end of said handle, a brush holder on said head, and a brush removably mounted on said brush holder, said head and said tubular handle being provided with registering flat sides whereby the head is held against rotation in relation to said handle.

In testimony whereof I have signed my name to this specification.

BERNARD A. LEWIS.